(12) United States Patent
Curtis

(10) Patent No.: US 9,620,079 B2
(45) Date of Patent: *Apr. 11, 2017

(54) VISUALIZING, CREATING AND EDITING BLENDING MODES METHODS AND SYSTEMS

(71) Applicant: Ancestry.com Operations Inc., Provo, UT (US)

(72) Inventor: Donald B. Curtis, Highland, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 616 days.

This patent is subject to a terminal disclaimer.

(21) Appl. No.: 13/733,045

(22) Filed: Jan. 2, 2013

(65) Prior Publication Data

US 2013/0219327 A1    Aug. 22, 2013

Related U.S. Application Data

(63) Continuation of application No. 12/240,566, filed on Sep. 29, 2008, now Pat. No. 8,370,759.

(51) Int. Cl.
*G06F 3/048* (2013.01)
*G06F 3/0481* (2013.01)
(Continued)

(52) U.S. Cl.
CPC ......... *G09G 5/026* (2013.01); *G06F 3/0484* (2013.01); *G06T 11/00* (2013.01); *G06F 3/048* (2013.01);
(Continued)

(58) Field of Classification Search
CPC .... G06F 3/048; G06F 3/0481; G06F 3/04817; G06F 3/0484–3/04847; G09G 5/02; G09G 5/06; G06T 5/001; G06T 5/003; G06T 5/005; G06T 11/001; G06T 11/20–11/206; G06T 15/503; H04N 1/62
See application file for complete search history.

(56) References Cited

U.S. PATENT DOCUMENTS 4,654,805 A    3/1987  Shoup, II
4,866,784 A    9/1989  Barski
(Continued)

OTHER PUBLICATIONS

Werner D. Streidt, The Filter Factory Programming Guide, Copyright © 1996/98 by—Apr. 10th, 1998 retrieved from Internet at http://thepluginsite.com/knowhow/ffpg/ffpg.htm on Apr. 11, 2015.*
(Continued)

*Primary Examiner* — Eric J Bycer
(74) *Attorney, Agent, or Firm* — Kilpatrick Townsend & Stockton LLP

(57) ABSTRACT

A method of creating a blending mode for blending base colors and blend colors to produce resultant colors for one or more pixels of a digital image includes displaying by a display device a relationship between a first independent variable representing the base colors and a dependent variable representing the resultant colors for a specific value of a second independent variable representing blend colors. The method also includes receiving user input altering the relationship, displaying the altered relationship, and storing the relationship as a blending mode.

6 Claims, 6 Drawing Sheets

(51) Int. Cl.

| | | |
|---|---|---|
| *G06F 3/0484* | (2013.01) | |
| *G09G 5/02* | (2006.01) | |
| *G09G 5/06* | (2006.01) | |
| *G06T 5/00* | (2006.01) | |
| *G06T 11/00* | (2006.01) | |
| *G06T 11/20* | (2006.01) | |
| *G06T 15/50* | (2011.01) | |
| *H04N 1/62* | (2006.01) | |

(52) U.S. Cl.
CPC ........ *G06F 3/0481* (2013.01); *G06F 3/04817* (2013.01); *G06F 3/04847* (2013.01); *G06T 5/001* (2013.01); *G06T 5/003* (2013.01); *G06T 5/005* (2013.01); *G06T 11/001* (2013.01); *G06T 11/20* (2013.01); *G06T 11/203* (2013.01); *G06T 11/206* (2013.01); *G06T 15/503* (2013.01); *G09G 5/02* (2013.01); *G09G 5/06* (2013.01); *H04N 1/62* (2013.01)

(56) References Cited

U.S. PATENT DOCUMENTS

| | | | |
|---|---|---|---|
| 5,054,098 A | 10/1991 | Lee | |
| 5,093,653 A | 3/1992 | Ikehira | |
| 5,181,260 A | 1/1993 | Kurosu et al. | |
| 5,187,753 A | 2/1993 | Bloomberg et al. | |
| 5,228,119 A * | 7/1993 | Mihalisin | G09G 5/00 345/418 |
| 5,231,504 A * | 7/1993 | Magee | H04N 1/6058 358/500 |
| 5,289,205 A * | 2/1994 | Torres | G06F 3/04855 345/685 |
| 5,307,452 A | 4/1994 | Hahn et al. | |
| 5,483,626 A | 1/1996 | Nakayama | |
| 5,563,403 A | 10/1996 | Bessho et al. | |
| 5,568,600 A | 10/1996 | Kaba | |
| 5,854,851 A | 12/1998 | Bamberger et al. | |
| 5,900,862 A * | 5/1999 | Silverbrook et al. | 345/603 |
| 5,937,083 A * | 8/1999 | Ostuni | G06T 3/0068 382/131 |
| 6,075,903 A | 6/2000 | Breiter et al. | |
| 6,097,855 A | 8/2000 | Levien | |
| 6,208,351 B1 * | 3/2001 | Borg et al. | 345/600 |
| 6,239,782 B1 | 5/2001 | Siegel | |
| 6,269,196 B1 | 7/2001 | Hamburg | |
| 6,282,326 B1 | 8/2001 | Lee et al. | |
| 6,289,364 B1 * | 9/2001 | Borg et al. | 715/209 |
| 6,333,997 B1 | 12/2001 | Hashiya et al. | |
| 6,360,026 B1 | 3/2002 | Kulkarni et al. | |
| 6,417,862 B1 * | 7/2002 | Brothers | G06T 15/503 345/589 |
| 6,418,244 B2 | 7/2002 | Zhou et al. | |
| 6,421,460 B1 | 7/2002 | Hamburg | |
| 6,430,320 B1 | 8/2002 | Jia et al. | |
| 6,462,786 B1 * | 10/2002 | Glen et al. | 348/599 |
| 6,760,485 B1 | 7/2004 | Gilman et al. | |
| 6,778,691 B1 | 8/2004 | Barski et al. | |
| 6,856,705 B2 | 2/2005 | Perez et al. | |
| 7,027,666 B2 | 4/2006 | Rudak et al. | |
| 7,065,261 B1 | 6/2006 | Horie | |
| 7,136,075 B1 * | 11/2006 | Hamburg | 345/592 |
| 7,145,699 B2 | 12/2006 | Dolan | |
| 7,180,524 B1 * | 2/2007 | Axelrod | 345/593 |
| 7,184,056 B2 | 2/2007 | Brody et al. | |
| 7,215,813 B2 | 5/2007 | Graves et al. | |
| 7,277,600 B2 | 10/2007 | Najman | |
| 7,336,277 B1 | 2/2008 | Clark et al. | |
| 7,340,110 B2 | 3/2008 | Lim et al. | |
| 7,423,696 B2 | 9/2008 | Samadani et al. | |
| 7,432,926 B1 * | 10/2008 | Cherkas | G06F 17/10 345/440 |
| 7,444,038 B2 | 10/2008 | Shimizu et al. | |
| 7,483,042 B1 * | 1/2009 | Glen | 345/629 |
| 7,483,083 B2 | 1/2009 | Li et al. | |
| 7,486,299 B2 | 2/2009 | Debevec et al. | |
| 7,495,679 B2 | 2/2009 | Chou | |
| 7,535,482 B2 | 5/2009 | Lee et al. | |
| 7,542,165 B2 | 6/2009 | Kawakatsu et al. | |
| 7,576,750 B2 | 8/2009 | Eckhardt et al. | |
| 7,595,801 B1 * | 9/2009 | Cherkas | G06T 11/20 345/418 |
| 7,693,341 B2 | 4/2010 | Pettigrew et al. | |
| 7,715,649 B2 | 5/2010 | Kameyama | |
| 8,073,285 B2 | 12/2011 | Curtis | |
| 8,175,409 B1 * | 5/2012 | Wilensky | 382/274 |
| 8,370,759 B2 | 2/2013 | Curtis | |
| 2002/0164087 A1 | 11/2002 | Chien et al. | |
| 2003/0012437 A1 | 1/2003 | Zaklika et al. | |
| 2003/0030634 A1 * | 2/2003 | Sang'udi | G06F 3/0481 345/418 |
| 2003/0161546 A1 | 8/2003 | Sobol et al. | |
| 2004/0059518 A1 * | 3/2004 | Rothschild | G06F 17/18 702/18 |
| 2004/0120604 A1 | 6/2004 | Najman | |
| 2004/0130552 A1 | 7/2004 | Duluk et al. | |
| 2004/0165788 A1 * | 8/2004 | Perez et al. | 382/284 |
| 2005/0031167 A1 | 2/2005 | Hu et al. | |
| 2005/0058367 A1 | 3/2005 | Fujimoto | |
| 2006/0061572 A1 * | 3/2006 | Phelan | G06T 11/206 345/440 |
| 2006/0214935 A1 * | 9/2006 | Boyd et al. | 345/473 |
| 2006/0284878 A1 * | 12/2006 | Zimmer | 345/581 |
| 2006/0290702 A1 * | 12/2006 | White et al. | 345/522 |
| 2007/0008337 A1 * | 1/2007 | White et al. | 345/629 |
| 2007/0036456 A1 | 2/2007 | Hooper | |
| 2007/0104389 A1 | 5/2007 | Wells | |
| 2007/0133871 A1 | 6/2007 | Yoshiura | |
| 2007/0247679 A1 | 10/2007 | Pettigrew et al. | |
| 2008/0094411 A1 * | 4/2008 | Parenteau et al. | 345/592 |
| 2008/0131010 A1 * | 6/2008 | Wilensky | 382/238 |
| 2008/0144954 A1 * | 6/2008 | Chien | H04N 1/62 382/254 |
| 2009/0052802 A1 | 2/2009 | Curtis | |
| 2009/0060378 A1 | 3/2009 | Curtis | |
| 2009/0297022 A1 | 12/2009 | Pettigrew et al. | |
| 2009/0310154 A1 * | 12/2009 | Morovic | H04N 1/54 358/1.9 |

OTHER PUBLICATIONS

Author Unknown, "The Rotate tool in Toolbox." Jul. 18, 2006. 3 pages. Accessed at http://web.archive.org/web/20060718040101/http://docs.gimp.org/en/gimp-tool-rotate.html.

ftp://ftp.gimp.org/pub/gimp/v2.2/ (2.2.12 on Jul. 6, 2006).

Hammel, Michael J., "Patterns and Gradients" In *The Artist's Guide to GIMP Effects*, Chapter 1 Section 1.6. No Starch Press, Aug. 17, 2007. 29 pages.

* cited by examiner

VISUALIZING, CREATING AND EDITING BLENDING MODES METHODS AND SYSTEMS

CROSS-REFERENCES TO RELATED APPLICATIONS

This patent application is related to the following co-pending, commonly assigned U.S. patent application Ser. No. 11/844,443, entitled, "USER INTERFACE METHOD FOR SKEW CORRECTION," filed on Aug. 24, 2007; and Ser. No. 11/845,635, entitled "USER INTERFACE METHODS AND SYSTEMS FOR IMAGE BRIGHTNESS AND CONTRAST," filed Aug. 27, 2007, the entire disclosure of each of which being incorporated herein for all purposes.

FIELD OF THE INVENTION

Embodiments of the present invention relate generally to image editing systems and methods. More specifically, embodiments of the invention relate to systems and methods for image blending, including useful interfaces for accomplishing image blending and defining imaging blending modes.

BACKGROUND OF THE INVENTION

Presently-available image editing software programs provide the ability to "draw" on a digital image. Drawing may be performed with a digital pen or brush or some other mechanism that changes the colors in the image. Commonly, this involves "blending" a preexisting image property (e.g., color, luminosity, etc.) with data represented by the image editing tool being used. Similarly, a foreground image may be blended with a background image. The blending process may employ "blending modes." Blending modes specify how to combine new image data, either from a tool or a foreground image, with the image data already present in the image.

A common blending mode is the "Normal" blending mode, which simply replaces the current image data with the new image data. Other pre-defined blending modes include: "Color Burn," "Color Dodge," "Darken," "Difference," "Dissolve," "Exclusion," "Hard Light," "Hard Mix," "Lighten," "Linear Burn," "Linear Dodge," "Multiply," "Overlay," "Pin Light," "Screen," "Soft Light," and "Vivid Light." Names given to pre-defined blending modes often attempt to describe the process used to do the blend, the way the blending mode might be most commonly used, and/or an expected result of the blend.

Whatever the name, a blending mode is a specific transformation that takes two inputs (the base color—the original color in the image, sometimes called the background; and the blend color—the color used by the image editing tool or contained in a foreground image, sometimes called the foreground), and from them produces a resulting color that replaces the color in the image. Other properties such as opacity also may be used in conjunction with the blending mode to determine the resulting color. The blending mode transformation could be constructed from a continuous function or in some other way. The blending mode defines what the output will be for each potential combination of inputs.

Written descriptions have been used to communicate to a user the effect of a blending mode and to describe what it does and how it might be used. Pictorial examples may be used to attempt to demonstrate the effect of the blending mode. Such descriptions and pictures can give the user a basic idea of what the blending mode does, but they are imprecise, incomplete, and do not fully convey the transformation associated with the blending mode. Better methods are needed to fully convey the blending mode transformation to the user.

Moreover, the limited set of predefined blending modes is inadequate to produce the type of blending that a user may require. Although additional pre-defined blending modes could address this problem, no set of predefined blending modes will ever address every need. Therefore, methods are needed to enable a user to create custom blending modes.

BRIEF SUMMARY OF THE INVENTION

Embodiments of the invention provide a method of creating a blending mode for blending base colors and blend colors to produce resultant colors for one or more pixels of a digital image. The method includes displaying by a display device a relationship between a first independent variable representing the base colors and a dependent variable representing the resultant colors for a specific value of a second independent variable representing blend colors. The method also includes receiving user input altering the relationship, displaying the altered relationship, and storing the relationship as a blending mode. In some embodiments, the method includes receiving user input selecting one or more additional specific values of the second independent variable. For each selection, user input may be received altering the relationship. For each selection, the altered relationship may be displayed. The method also may include storing the relationship as part of the blending mode. The method may include interpolating a third relationship for a third specific value of the second independent variable. The third relationship may be based on an altered relationship. The method may include replicating a third relationship for a third specific value of the second independent variable. The third relationship may be based on an altered relationship. The method also may include receiving user input selecting a pixel of the digital image. The selected pixel may have a specific base color value. The method also may include receiving user input selecting the specific value of the second independent variable as a blend color to be applied to the pixel and setting a resultant color for the pixel in accordance with the specific base color value, the specific value of the second independent variable, and the relationship. The method also may include receiving user input selecting a background image, receiving user input selecting a foreground image, and applying the blending mode to one or more pixels.

Other embodiments provide a blending mode graphical user interface. The GUI includes means for displaying a relationship between a first independent variable and a dependent variable for a specific value of a second independent variable, and means for receiving user input to select different specific values of the second independent variable to thereby display different relationships between the first independent variable and the dependent variable for the different specific values of the second independent variable. The graphical user interface is displayable by an output device. In some embodiments, the means for displaying the relationship includes a first axis for representing the first independent variable and a second axis for representing the dependent variable. The relationship may be represented as at least one line segment. The at least one line segment may include means for receiving user input to thereby change the relationship between the first independent variable and the dependent variable for a specific value of the second independent variable. The first independent variable may represent base colors, the second independent variable, blend colors, and the dependent variable, resultant colors. The means for displaying the relationship may include a rectangle having the first independent variable along a first side and the dependent variable along an adjacent side. The means for receiving user input to select different specific values of the second independent variable may include one or more of a slide, dial, dropdown menu, pick list, and/or data field.

Still other embodiments provide a blending mode graphical user interface that includes a first object that depicts a relationship between a first independent variable and a dependent variable for a specific value of a second independent variable and a second object that depicts a user input to select different specific values of the second independent variable to thereby display different relationships between the first independent variable and the dependent variable for the different specific values of the second independent variable. The graphical user interface is displayable by an output device. In some embodiments, the first object that depicts the relationship comprises a first axis that represents the first independent variable and a second axis that represents the dependent variable. The relationship may be represented as at least one line segment. The at least one line segment may be configured to receive user input to thereby change the relationship between the first independent variable and the dependent variable for a specific value of the second independent variable. The first independent variable may represent base colors, the second independent variable, blend colors, and the dependent variable, resultant colors. The first object may be a rectangle having the first independent variable along a first side and the dependent variable along an adjacent side. The second object may be a slide, dial, dropdown menu, pick list, and data field.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
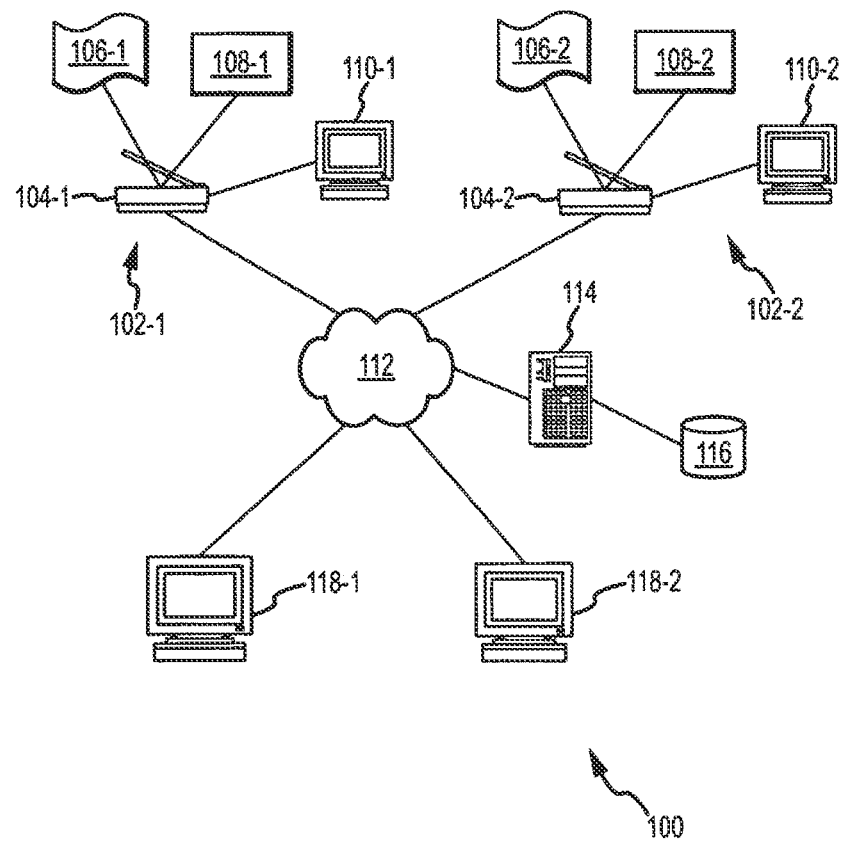
FIG. 1 depicts an exemplary system in which embodiments of the invention may be implemented.

Embodiments of the present invention relate to image editing systems, methods, and user interfaces. In order to provide a context for describing embodiments of the present invention, embodiments of the invention will be described herein with reference to editing images of documents, which may include books, public records, paper documents, microfilm or microfiche documents, and/or the like. Those skilled in the art will appreciate, however, that other embodiments are possible.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Embodiments of the present invention relate to viewing, creating, and editing blending modes in image editing systems. FIG. 1 depicts an exemplary production scanning and image editing system 100 within which embodiments of the invention may be implemented. Those skilled in the art will appreciate that the system 100 is merely exemplary of a number of possible embodiments. The system 100 includes scanning processes 102 that include scanners 104. The scanning processes may be configured to scan images from microfilm or microfiche 106, paper documents 108, books, public records, historical documents, and/or the like. The scanning processes also include an operator workstation 110, which may be integral with the scanner 104.

Image files comprising scanned images may be sent via a network 112 to a server 114 and stored in a database 116 for further processing or use. The images are thereafter available for post-production processing, which may take place at, for example, post-scanning workstations 118.

A post-production image editing technician may use a workstation, such as the workstation 118-1, to perform image editing using blending modes. Among other things, embodiments of the present invention enable users to better understand the transformation that any given blending mode performs and/or create and edit custom blending modes. This is accomplished using a graphical user interface that depicts the relationship among the variables in the blending mode transformation.

There are three primary variables in the blending transformation: the base color, the blend color, and the resulting color. (Note that other blending modes may have additional variables or operate on different variables than these three. Also note that while blending modes can treat each channel of a color specification (such as R, G, and B) independently and with the same transformation, embodiments of the present invention described herein will focus on a single color transformation. Those skilled in the art will readily appreciate that the principles of the present invention described herein can easily be extended to independent operations (i.e., different transformations) on multiple color channels.) One approach to graphically displaying a blending transformation is to construct a 3-dimensional representation that depicts the relationship of the three variables. Such a representation may be produced on a continuous surface. Another approach, however, uses a 2-dimensional representation to display the blending transformation (for a single color channel). Assuming 8-bit color, the 2-D representation can be conceptualized as 256 parallel "slices," each depicting a 2-D representation of two of the three transformation variables. That is, each 2-D representation depicts a transformation between all possible base colors and all possible resulting colors for a single blend color. Such a 2-D representation is depicted at FIGS. 2A and 2B.

Figure 2A:
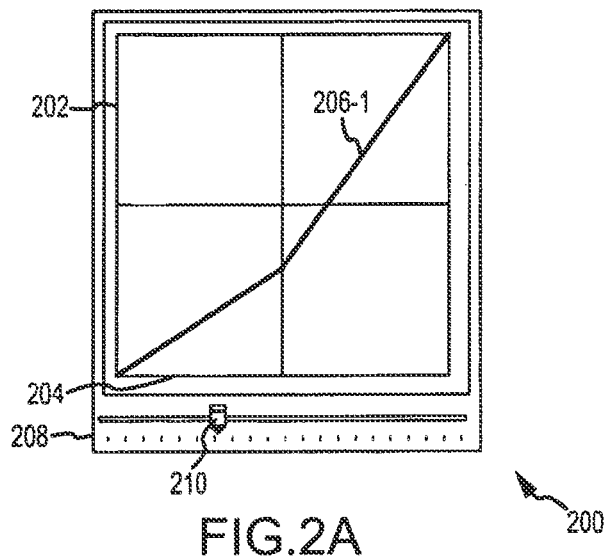
FIGS. 2A, 2B, 3A, 3B, 4A, 4B, 5A, and 5B depict various exemplary embodiments of a blending modes graphical user interface according to embodiments of the invention.
Figure 2B:
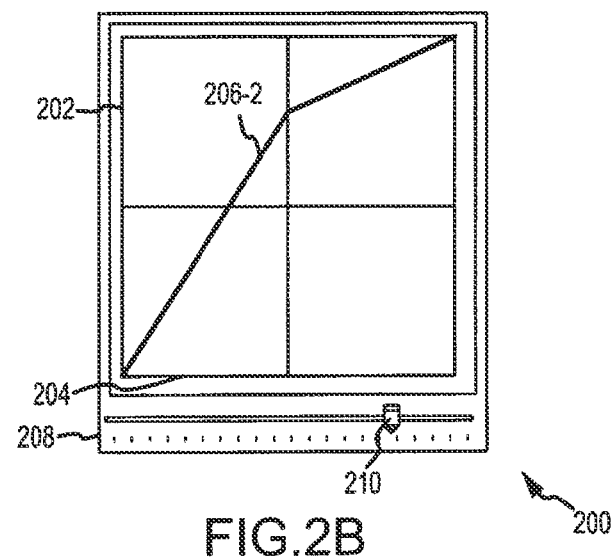

FIGS. 2A and 2B depict first and second views, respectively, of a blending modes graphical user interface (GUI) 200 according to embodiments of the invention. In this particular example, the GUI depicts the Overlay Blending Mode for two different blend colors. The GUI 200 includes a vertical axis 202 and a horizontal axis 204. In this exemplary embodiment, the horizontal and vertical axes are perpendicular to one another, although this is not a requirement. In this example, the horizontal axis 204 represents all possible base colors; the vertical 202 axis represents all possible resulting colors. The horizontal axis 204 represents an independent variable; the vertical axis 202 represents a dependent variable. The line 206 represents the relationship between the base color and the resulting color for all possible values of each. The line 206 may be a single line segment or may be made up of several line segments.

As mentioned above, each view of the GUI 200 represents the relationship between the base color and the resulting color for a single blend color. The specific blend color depicted by a particular view is determined by a blend color slide indicator 208 and the position of a slide 210 on the indicator. The slide 210, therefore acts as a second independent variable. Hence, in this example, the relationship 206-1 represents the transformation for a first blend color, and the transformation 206-2 represents the relationship for a second blend color 206-2. A user may use the slide 210 to reveal the transformation for any possible blend color.

Although in this exemplary embodiment, the base color is depicted on the horizontal axis, the resulting color is depicted on the vertical axis, and the blend color is determined by the slide control 208, this is not a requirement. The variables may be interchangeable and user determinable.

The relationship 206 may itself serve as a user input that allows a user to select the transformation for any given blend color (or other variable if used as the second independent variable). For 8-bit color, the user may set the relationship between base color and resulting color 256 times, once for each possible blending color. Because this could be an overwhelming task, however, some embodiments provide interpolation between specific blend colors set by the user. The user may elect to "lock" specific base color choices to thereby prevent them from being altered by changes to other blend color transformation settings. Or the GUI 200 may be programmed to provide user setting of only a limited number of blending colors. Many examples are possible. Moreover, different interpolation functions may be applied. For example, specific blend colors may serve as an anchor point, and the interpolated transformation for nearby blend colors may be affected by movements of the transformation on either side of the blend color acting as an anchor point. Many examples are possible.

Although the relationships 206-1 and 206-2 in FIGS. 2A and 2B depict transformations having discontinuities, this need not be the case. The views 300 and 302 of FIGS. 3A and 3B respectively, depict curved transformations 306-1 and 306-2. In these transformations, the base colors are transformed smoothly and continuously as represented by the curves for two different blend colors. Embodiments of the invention may use curve sets, such as Bezier curves as the basis for a virtually unlimited number of user-defined or pre-defined blending modes.

In addition to the variables identified and discussed above—base color, blend color, and resulting color—many other variables may be introduced and user definable to result in tremendous flexibility for user. These include:

Starting base color threshold. This value defines where the blending operation begins to have an affect on the image. Base colors less than this value remain unchanged.

Ending base color threshold. This value describes the number of colors at the end of scale that are to remain unchanged. For example, in an 8 bpp example with a threshold of 10, base colors greater than 255–10 (245) remain unchanged.

Description of the remaining portion of the transformation function. This could be, for example, a set of one or more portions of the transformation curve for one or more of the blend colors. The description would be constrained such that exactly one result value would be present for each base color. The description might include:

A starting and ending point of the base colors that are affected.

What the result value should be at the start base color point.

What the result value should be at the end base color point.

How the values in between the start and end point should be generated:
  As a linear interpolation between the two points, OR
  As a curve between the two points. If a curve:
    The type of curve (e.g. Bezier)
    The magnitude of the curve and its direction (positive or negative)
    Whether the curve has an influence beyond the start and/or end points.

Mid-tone blending color threshold. This value describes the number of mid-tone values on each side of the center value of the blending colors that will not cause a change in the image. For example, if the threshold is 2, then none of the blending colors 126, 127, 128, and 129 (the four center values in 8 bpp) will affect the resulting image colors, i.e. the base colors will remain unchanged.

Figure 4A:
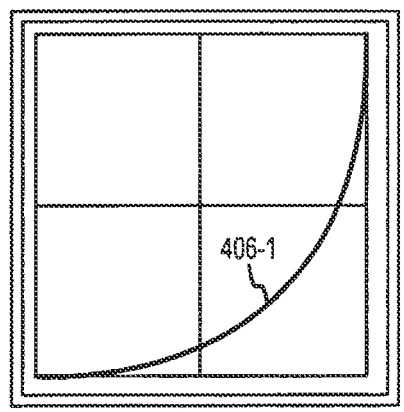
Figure 4B:
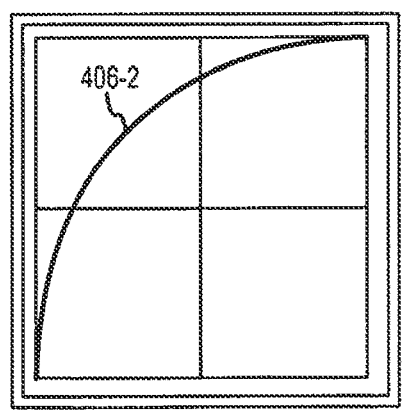

Interpolation between transformation functions across blending colors. As mentioned above, the blending transformation for first and second blending colors may be set, and all the transformations for blending colors in between the two could be automatically calculated by interpolation (e.g., by linear interpolation). This greatly simplifies the definition of the set of blending transformations. To with, rather than defining 256 transformations, one for each blending color, only two (or some other number smaller than 256) may be defined and the remaining ones defined by interpolation and/or replication. FIGS. 4A and 4B depict, respectively, curves 406-1 and 406-2 for a blending color of 0 and a blending color of 255. The transformations for the blending colors in between are generated by interpolating the magnitude of the two curves.

Figure 5A:
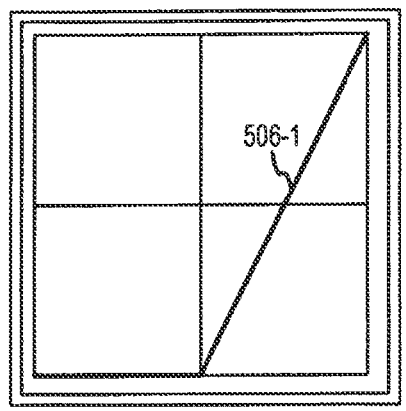
Figure 5B:
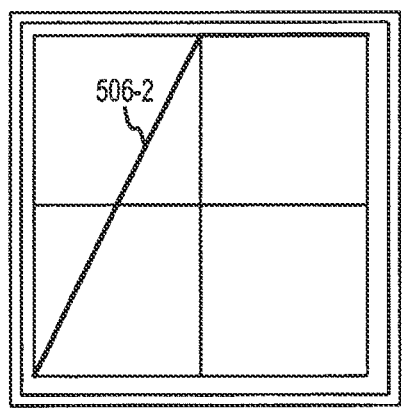

FIGS. 5A and 5B depict a similar interpolation example. In this example, the relationship 506-1 of FIG. 5A defines the blending transformation for blending color 0 and the relationship 506-2 of FIG. 5B defines the blending transformation for blending color 255. All the blending transformations for blending colors in between 0 and 255 are defined as linear interpolations of the common point of the two lines, between the starting and ending point of that shared point.

Figure 6:
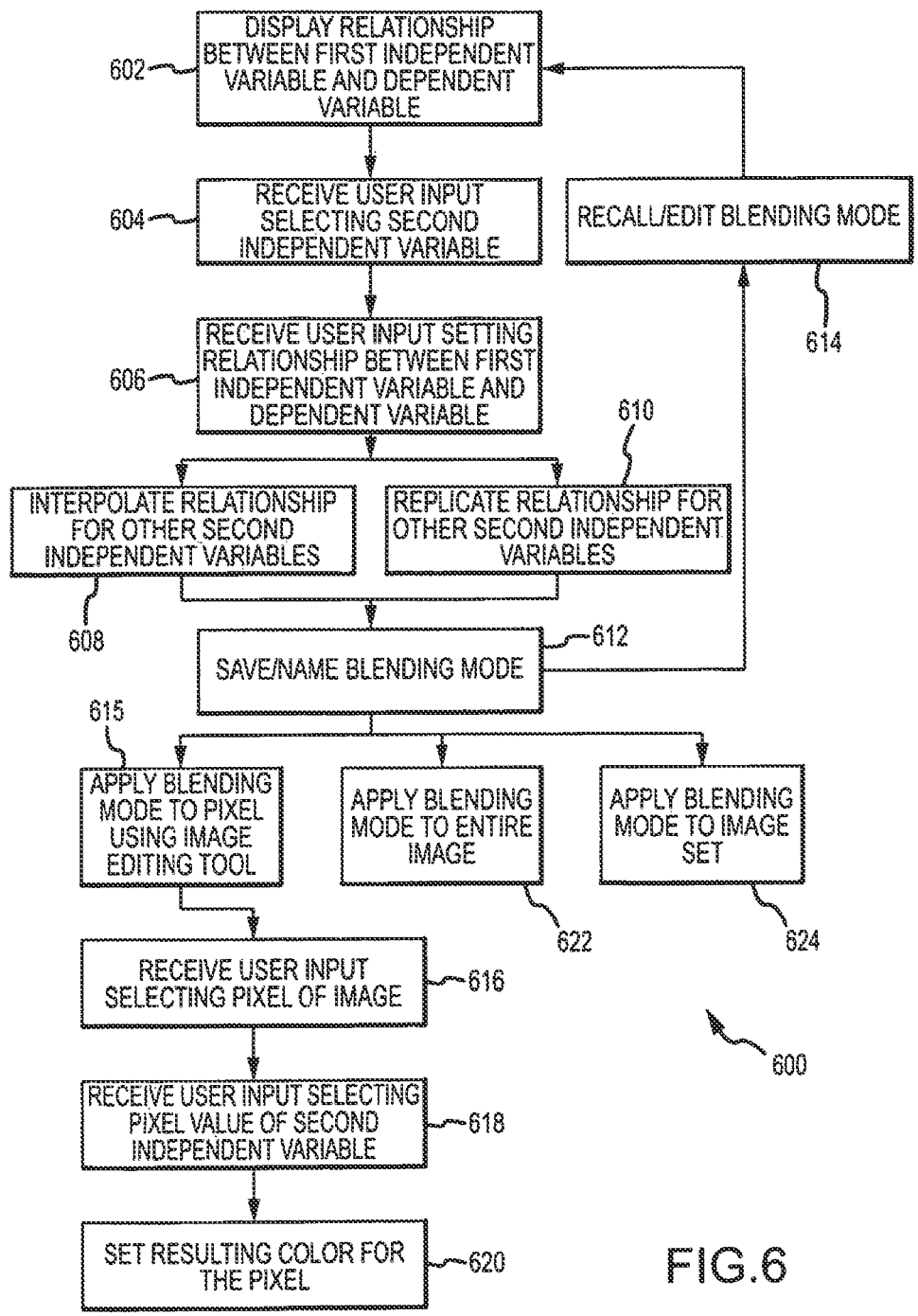
FIG. 6 depicts an exemplary method of creating, editing, and using blending modes according to embodiments of the invention, which may be implemented in the system of FIG. 1.

Having described an exemplary system 100 and various exemplary embodiments of a graphical user interface (FIGS. 2A, 2B, 3A, 3B, 4A, 4B, 5A, and 5B), attention is directed to FIG. 6, which depicts an exemplary method 600 according to embodiments of the invention. The method 600 may be implemented in the system of FIG. 1. For example, the method may be embodied in software (computer-readable/ executable instructions) that programs a workstation 118. Those skilled in the art will appreciate that the method 600 is merely exemplary of a number of possible embodiments. Other embodiments may include more, fewer, or different steps than those illustrated and described herein.

The method 600 begins at block 602, at which a relationship between a first independent variable (e.g., base color) and a dependent variable (e.g., resulting color) is displayed. At block 604, a user input is received that specifies a value for a second independent variable (e.g., blend color). These three steps result in one of the exemplary GUIs of FIGS. 2-5.

Figure 3A:
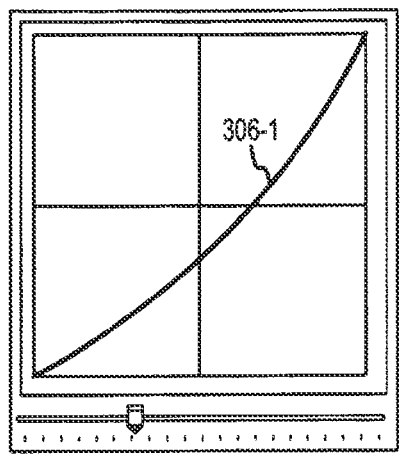
Figure 3B:
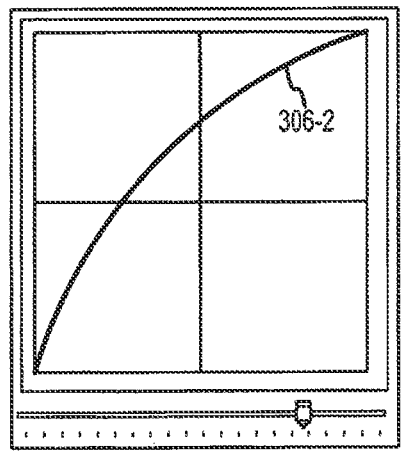

At block 606, a user input is received that alters the relationship between the base color and the resulting color for the specified blend color. The result may resemble any of the relationships depicted in FIGS. 2-5 or any of a variety of other relationships. For example, the relationship may be linear over the entire range. Or the relationship may include several line segments having different slopes, as depicted in FIGS. 2A and 2B. The relationship may be represented by a curve, as depicted in FIGS. 3A and 3B. If curved, the relationship may have any curvature. Further, the relationship may be represented by multiple curve segments. Further still, the relationship may be represented by any combination of the foregoing.

At block 608, a relationship for other blend color values is determined by interpolation. For example, if the relationship is set at block 606 for a non-endpoint blend color, then for each blend color between this non-endpoint blend color and each endpoint blend color, the relationship may be interpolated based on the relationship set by the user at the non-endpoint blend color and a pre-existing relationship at each endpoint.

Alternatively, at block 610, the relationship defined at block 606 may be replicated for other blend colors. The resulting blending mode may be saved and named at block 612.

It should be appreciated that, by recalling the saved blending mode at block 614, the blending mode may be endlessly edited and resaved. This may include setting the relationship for other blend color values and either interpolating or replicating between values at the user's option.

At block 615, the blending mode may be applied to individual pixels of an image using, for example, an image editing tool. This is accomplished by the user selecting a pixel of the image at block 616 and a blend color at block 618. The resulting color is set for the pixel at block 620 using the relationship for the selected blend color and the pixel value as the base color.

At block 622, the blending mode is applied to an image. In such an example, a foreground image is blended into a background image by taking the pixel value at each pixel of the background image as the base color, the pixel value at each corresponding pixel of the foreground image as the blend color, and using the relationship for each blend color to determine the resulting color for the pixel. In a similar manner, at block 624, the blending mode may be applied to an entire image set. Many other examples are possible.

Having described several embodiments, it will be recognized by those of skill in the art that various modifications, alternative constructions, and equivalents may be used without departing from the spirit and scope of the invention. For example, embodiments of the present invention have been described with respect to a single color channel. In other embodiments, the principles may be applied to multiple color channels and or different variables (e.g., hue, intensity, etc.). Additionally, a number of well known processes and elements have not been described in order to avoid unnecessarily obscuring the present invention. Accordingly, the above description should not be taken as limiting the scope of the invention, which is defined in the following claims.

What is claimed is:

1. A method of creating a blending mode for blending base colors and blend colors to produce resultant colors for one or more pixels of a digital image, the method comprising:

displaying by a display device a relationship between a first independent variable representing a plurality of base colors and a dependent variable representing a plurality of resultant colors, wherein each resultant color is produced from blending one of a plurality of blend colors, represented by a second independent variable, with one of the base colors, and wherein the relationship displayed comprises plural line segments having different slopes in a graphical representation depicting the resultant colors produced from blending one of the blend colors with each of the base colors;

receiving user input selecting a first value of the second independent variable corresponding to a first blend color;

altering the relationship in response to receiving user input selecting the first value to create a first blend color relationship;

displaying the first blend color relationship;

receiving user input selecting a second value of the second independent variable corresponding to a second blend color;

altering the relationship in response to receiving user input selecting the second value to create a second blend color relationship;

displaying the second blend color relationship;

receiving user input selecting a third value of the second independent variable corresponding to a third blend color, wherein the third value is between the first value and the second value;

interpolating between the first blend color relationship and the second blend color relationship to create a third blend color relationship;

displaying the third blend color relationship; and storing the third blend color relationship as a blending mode.

2. The method of claim 1, wherein the graphical representation comprises a two dimensional graphical representation.

3. The method of creating a blending mode for blending base colors and blend colors to produce resultant colors for one or more pixels of a digital image of claim 1, further comprising:

receiving user input selecting a background image;
receiving user input selecting a foreground image; and
applying the blending mode to one or more pixels.

4. A blending mode graphical user interface, comprising:
an output device;
means for displaying via the output device a relationship between a first independent variable representing a plurality of base colors and a dependent variable representing a plurality of resultant colors, wherein each resultant color is produced from blending one of a plurality of blend colors, represented by a second independent variable, with one of the base colors, and wherein the relationship displayed comprises plural line segments having different slopes in a graphical representation depicting the resultant colors produced from blending one of the blend colors with each of the base colors;

means for receiving user input selecting a first value of the second independent variable corresponding to a first blend color;

means for altering the relationship in response to receiving user input selecting the first value to create a first blend color relationship;

means for displaying via the output device the first blend color relationship;

means for receiving user input selecting a second value of the second independent variable corresponding to a second blend color;

means for altering the relationship in response to receiving user input selecting the second value to create a second blend color relationship;

means for displaying via the output device the second blend color relationship;

means for receiving user input selecting a third value of the second independent variable corresponding to a third blend color, wherein the third value is between the first value and the second value;

means for interpolating between the first blend color relationship and the second blend color relationship to create a third blend color relationship;

means for displaying via the output device the third blend color relationship; and means for storing the third blend color relationship as a blending mode.

5. The blending mode graphical user interface of claim 4, wherein the means for displaying the relationship comprises a rectangle having the first independent variable along a first side and the dependent variable along an adjacent side.

6. The blending mode graphical user interface of claim 5, wherein the means for receiving user input selecting the first value of the second independent variable comprises at least one selection from a group consisting of slide, dial, drop-down menu, pick list, and data field.

* * * * *